US011012490B2

(12) United States Patent
Eisl et al.

(10) Patent No.: US 11,012,490 B2
(45) Date of Patent: May 18, 2021

(54) CUSTOMER EXPERIENCE MANAGEMENT INTERACTION WITH CACHING

(75) Inventors: Jochen Eisl, Garching (DE); Gerhard Kuhn, Munich (DE); Matthias Lott, Planegg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1561 days.

(21) Appl. No.: 14/375,875

(22) PCT Filed: Feb. 6, 2012

(86) PCT No.: PCT/EP2012/051909
§ 371 (c)(1),
(2), (4) Date: Aug. 29, 2014

(87) PCT Pub. No.: WO2013/117211
PCT Pub. Date: Aug. 15, 2013

(65) Prior Publication Data
US 2014/0379872 A1    Dec. 25, 2014

(51) Int. Cl.
*H04L 29/08* (2006.01)
*H04L 29/06* (2006.01)
(Continued)

(52) U.S. Cl.
CPC ............ *H04L 65/608* (2013.01); *G06F 16/40* (2019.01); *H04L 47/70* (2013.01); *H04L 51/10* (2013.01);
(Continued)

(58) Field of Classification Search
CPC ....... H04L 47/70; H04L 65/608; H04L 65/80; H04L 67/322; H04L 67/06; H04L 51/10;
(Continued)

(56) References Cited

U.S. PATENT DOCUMENTS 6,167,438 A * 12/2000 Yates ...................... H04L 29/06
709/216
6,335,927 B1 * 1/2002 Elliott ..................... H04L 12/14
370/352

(Continued)

FOREIGN PATENT DOCUMENTS

EP          1521405 A1    4/2005
WO    WO 20061126961 A2   11/2006

OTHER PUBLICATIONS

International Search Report and Written Opinion dated Jun. 6, 2013 corresponding to International Patent Application No. PCT/EP2012/051909.

(Continued)

Primary Examiner — Kristie D Shingles
(74) Attorney, Agent, or Firm — Squire Patton Boggs (US) LLP

(57) ABSTRACT

One embodiment includes a method and apparatus for allocating resources for the streaming of multimedia content in a network. The method includes analyzing multimedia content to determine media characteristics of the multimedia content, receiving a request to access the multimedia content from a user, and sending a request for resources for the multimedia content to a traffic management node. The request for resources includes the determined media characteristics of the multimedia content.

24 Claims, 5 Drawing Sheets

(51) Int. Cl.
*G06F 16/40* (2019.01)
*H04L 12/58* (2006.01)
*H04L 12/911* (2013.01)

(52) U.S. Cl.
CPC .............. *H04L 51/38* (2013.01); *H04L 67/06* (2013.01); *H04L 67/322* (2013.01); *H04L 29/08729* (2013.01); *H04L 29/08792* (2013.01)

(58) Field of Classification Search
CPC .............. H04L 51/38; H04L 29/08792; H04L 29/08729; G06F 17/30017; G06F 16/40
USPC ......................................................... 709/219
See application file for complete search history.

(56) References Cited

U.S. PATENT DOCUMENTS

| | | | | |
|---|---|---|---|---|
| 6,374,112 | B1 * | 4/2002 | Widegren | H04W 28/18 370/352 |
| 6,501,737 | B1 * | 12/2002 | Mathal | H04L 47/2416 370/252 |
| 7,433,311 | B1 * | 10/2008 | Kalyanasundaram | H04L 41/5029 370/235 |
| 7,653,735 | B2 * | 1/2010 | Mandato | H04L 29/06 709/205 |
| 8,572,258 | B2 * | 10/2013 | Castellanos Zamora | H04L 65/80 709/217 |
| 8,644,337 | B2 * | 2/2014 | Siddam | H04L 12/1407 370/235 |
| 8,683,066 | B2 * | 3/2014 | Hurst | H04N 21/23439 709/231 |
| 8,694,400 | B1 * | 4/2014 | Certain | G06Q 30/08 705/26.3 |
| 8,761,099 | B2 * | 6/2014 | Charbit | H04W 72/04 370/329 |
| 8,813,144 | B2 * | 8/2014 | Davis | H04N 21/23608 370/464 |
| 8,868,772 | B2 * | 10/2014 | Major | H04N 21/25808 709/231 |
| 8,908,578 | B2 * | 12/2014 | Cho | H04W 72/0413 370/310 |
| 9,119,183 | B2 * | 8/2015 | Guo | H04W 76/025 |
| 9,173,134 | B2 * | 10/2015 | Chen | H04W 28/24 |
| 9,262,746 | B2 * | 2/2016 | Linton | G06Q 10/10 |
| 9,288,276 | B2 * | 3/2016 | Adamczyk | |
| 10,389,780 | B2 * | 8/2019 | Eshet | H04L 65/60 |
| 2004/0192324 | A1 * | 9/2004 | Rudkin | G06Q 30/06 455/452.2 |
| 2006/0149845 | A1 * | 7/2006 | Malin | H04L 67/322 709/228 |
| 2009/0172170 | A1 * | 7/2009 | Rey | H04L 29/06027 709/227 |
| 2010/0070628 | A1 | 3/2010 | Harrang et al. | |
| 2010/0195610 | A1 * | 8/2010 | Zhong | H04L 65/1016 370/329 |
| 2010/0268836 | A1 | 10/2010 | Jabri et al. | |
| 2011/0107379 | A1 * | 5/2011 | Lajoie | H04L 65/1016 725/87 |

OTHER PUBLICATIONS

Cisco Systems, Visual Networking Index: "Cisco Global Cloud Index: Forecast and Methodology, 2010-2015"; pp. 1-26, 2011.
S. Thakolsri et al: "QoE-Driven Cross-Layer Optimization for High Speed Downlink Packet Access"; Journal of Communications, vol. 4, No. 9, Oct. 2009; pp. 669-680; DOI:10.4304/jcm.4.9.669-680.

* cited by examiner

CUSTOMER EXPERIENCE MANAGEMENT INTERACTION WITH CACHING

BACKGROUND

Field

Embodiments of the invention relate to multimedia content in wireless networks, such as, but not limited to, the Universal Mobile Telecommunications System (UMTS) Terrestrial Radio Access Network (UTRAN) Long Term Evolution (LTE) and Evolved UTRAN (E-UTRAN).

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth.

Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

The Evolved 3GPP Packet Switched Domain, which is also known as the Evolved Packet System (EPS), provides IP connectivity using the E-UTRAN.

SUMMARY

One embodiment includes a method for allocating resources for the streaming of multimedia content in a network. The method includes analyzing multimedia content to determine media characteristics of the multimedia content, receiving a request to access the multimedia content from a user, and sending a request for resources for the multimedia content to a traffic management node. The request for resources includes the determined media characteristics of the multimedia content.

Another embodiment is directed to an apparatus. The apparatus includes at least one processor and at least one memory including computer program code. The at least one memory and the computer program code are configured, with the at least one processor, to cause the apparatus at least to analyze multimedia content to determine media characteristics of the multimedia content, receive a request to access the multimedia content from a user, and send a request for resources for the multimedia content to a traffic management node. The request for resources comprises the determined media characteristics of the multimedia content.

Another embodiment is directed to a computer program embodied on a computer readable storage medium, the computer program configured to control a processor to perform a process. The process includes analyzing multimedia content to determine media characteristics of the multimedia content, receiving a request to access the multimedia content from a user, and sending a request for resources for the multimedia content to a traffic management node, wherein the request for resources comprises the determined media characteristics of the multimedia content.

Another embodiment is directed to an apparatus including means for analyzing multimedia content to determine media characteristics of the multimedia content, means for receiving a request to access the multimedia content from a user, and means for sending a request for resources for the multimedia content to a traffic management node. The request for resources includes the determined media characteristics of the multimedia content.

In another embodiment, a method for allocating resources for the streaming of multimedia content in a network is provided. The method includes receiving a request for resources to be allocated to multimedia content in a network. The request for resources includes media characteristics of the multimedia content. The method further includes determining, based at least in part on the media characteristics, actual resource requirements for the multimedia content that can be supported by the network, and reserving a bearer with attribute values according to the actual resource requirements for the multimedia content.

Another embodiment is directed to an apparatus. The apparatus includes at least one processor and at least one memory including computer program code. The at least one memory and the computer program code are configured, with the at least one processor, to cause the apparatus at least to receive a request for resources to be allocated to multimedia content in a network. The request for resources comprises media characteristics of the multimedia content. The at least one memory and the computer program code are further configured, with the at least one processor, to cause the apparatus at least to determine, based at least in part on the media characteristics, actual resource requirements for the multimedia content that can be supported by the network, and reserve a bearer with attribute values according to the actual resource requirements for the multimedia content.

Another embodiment is directed to a computer program embodied on a computer readable storage medium, the computer program configured to control a processor to perform a process. The process includes receiving a request for resources to be allocated to multimedia content in a network. The request for resources includes media characteristics of the multimedia content. The process further includes determining, based at least in part on the media characteristics, actual resource requirements for the multimedia content that can be supported by the network, and reserving a bearer with attribute values according to the actual resource requirements for the multimedia content.

Another embodiment is directed to an apparatus including means for receiving a request for resources to be allocated to multimedia content in a network. The request for resources includes media characteristics of the multimedia content. The apparatus further includes means for determining, based at least in part on the media characteristics, actual resource requirements for the multimedia content that can be supported by the network, and means for reserving a bearer with attribute values according to the actual resource requirements for the multimedia content.

BRIEF DESCRIPTION OF THE DRAWINGS

For proper understanding of the invention, reference should be made to the accompanying drawings, wherein.

DETAILED DESCRIPTION

Figure 1:
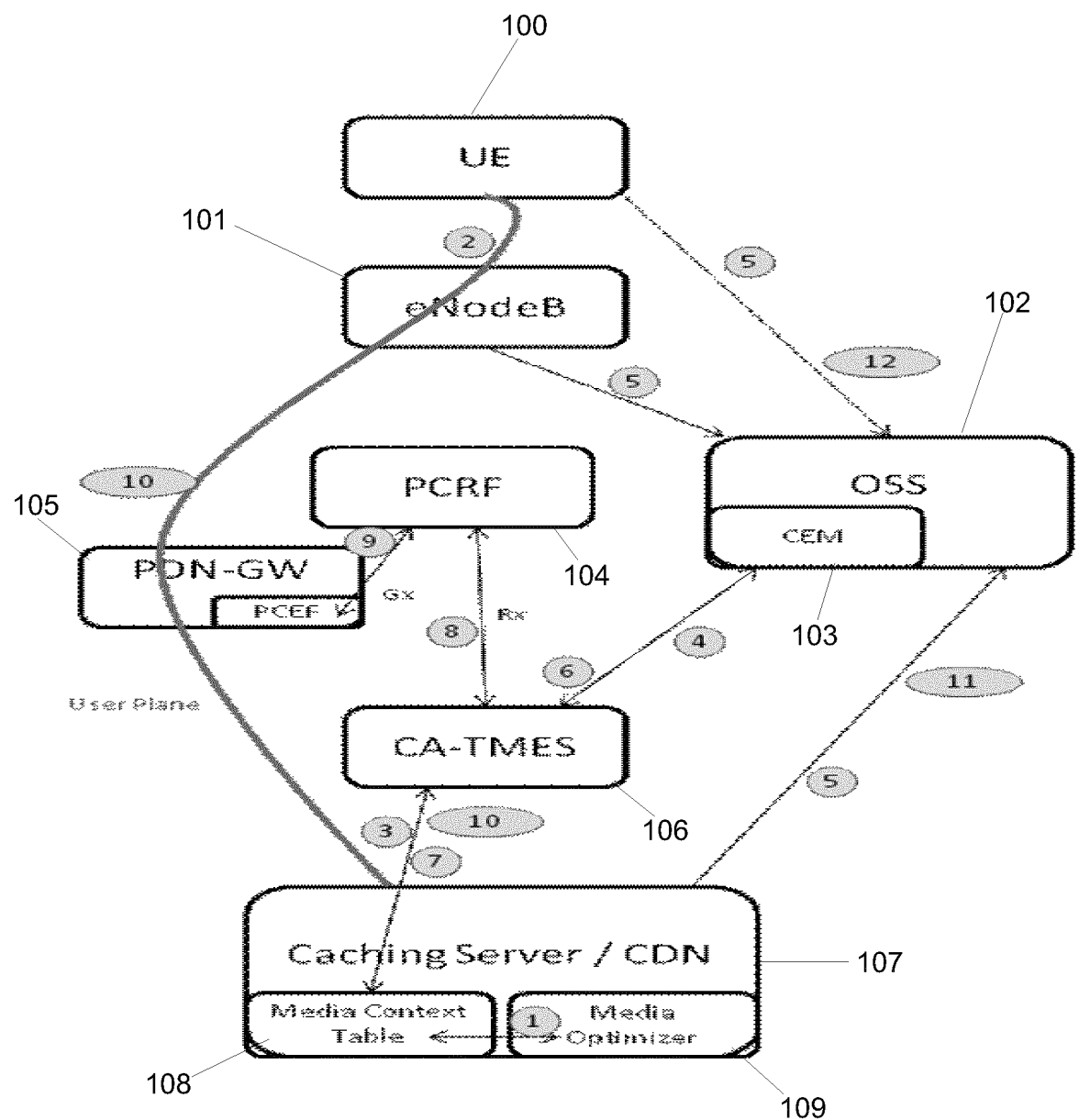
FIG. 1 illustrates a system according to one embodiment of the invention.

Embodiments of the invention relate to improved support for multimedia streaming of cached content in mobile networks. The mobile networks may include, but are not limited to, public land mobile networks (PLMN), such as the $3^{rd}$ generation (3G) mobile network architecture with radio access based on UMTS including further optimizations (e.g., HSPA) and LTE, as well as legacy 3GPP radio accesses or even non-3GPP accesses (e.g., WLAN). As will be discussed in detail below, currently there is no connection between cached content and resource management of the access network. An embodiment of the invention, therefore, provides a pre-analysis of the cached content to determine its resource requirements and attaching this information to the content. Then, when the content is requested by a user and the request is redirected to a cache node, QoS requirements can be determined together with additional information and communicated to the resource control entity of the access network. As a result, appropriate resource allocation can be performed for the content.

Some examples of multimedia streaming applications include video streaming and internet protocol television (IP-TV). The widespread usage of smart phones and tablet computers stimulated a significant increased usage of multimedia streaming applications in PLMN networks. Video sharing websites have served hundreds of millions of video views per day to mobile devices beginning in 2011. Intelligent mechanisms are needed to efficiently manage the flood of traffic generated by these multimedia applications. From a user's perspective it is essential that the multimedia experience is satisfactory despite the huge amount of traffic injected into PLMN networks. Sufficient resources should therefore be allocated for multimedia applications.

Streaming will likely be the dominant traffic type in mobile networks in the upcoming years, and may have exceeded 50% of global mobile traffic by the end of 2011. A popular video can be requested thousands of times in a short period of time, thereby placing significant strain on the mobile network infrastructure. One way to deal with popular videos is to cache them at a location close to the user, instead of repeatedly retrieving them from the servers of origin, to reduce network load. The user requests are then redirected to the caching server. The caching server then sends the stored video to the requesting user.

Existing content delivery networks (CDNs) are systems of computers and/or network elements containing copies of application data placed at various nodes/locations of a network. The purpose is to improve access to the data it caches by increasing access bandwidth and redundancy and reducing access latency, as well as reducing the traffic via peering points for improved quality of user experience (QoE) and reduced transfer costs. Data content types often cached in CDNs include web objects (text, graphics, URLs and scripts), downloadable objects (media files, software, documents), applications, live streaming media, and database queries.

In order to meet the rapid growth of streaming video traffic and to retain subscribers by delivering a sufficiently good QoE, communications service providers (CSPs) have begun to launch their own content delivery networks as a means to lessen the demands on the network backbone and to reduce infrastructure investments. The resulting tightly integrated overlay uses web caching, server-load balancing, request routing, and content services. Web caches store popular content on servers that have the largest demand for the content requested. These shared network appliances reduce bandwidth requirements, reduce server load, and improve the client response times for content stored in the cache.

There are different caching algorithms to manage the cache information stored on the network elements of the CSP. When the cache is full, the algorithm may choose which items to discard to clear storage for the new ones. The "hit rate" of a cache, which describes how often a searched-for item is actually found in the cache, is an important key performance indicator (KPI) for selecting the right algorithm. More efficient replacement policies keep track of detailed usage information in order to improve the hit rate (for a given cache size). Conventionally, the efforts to improve the performance of services in combination with CDNs and caching have focused on caching algorithms, forecasts of hit-rates, cache placement strategies and dimensioning of caches and backbone capacity, as well as methods to improve the cache latency, i.e., the time that a cache requires to return an item.

However, cached content is not sufficiently characterized with respect to the resource requirements for delivering the content to the user with satisfactory QoE. In particular, for services like streaming with high peak-to-average bandwidth ratios, the content is typically characterized only by means of typical measurements, such as average bandwidth demand.

The temporary QoE for a specific streaming application can be put in relation to the required bandwidth. The challenge is that the information about the content and its requirements is not known in advance by the network. Additionally, detailed information (e.g., peak-to-average data ratio, and when and how many peaks and low-rate phases in the data rate occur during a complete session) is not delivered at the beginning of a streaming session. Consequently, when content, such as streaming, video, or multimedia content, is cached, nothing is known about the resource requirements within the entity that decides on the allocation of resources.

As a result, one issue with the caching of streaming, video, and/or multimedia content is the lack of optimized resource usage and provisioning of the expected QoE to the user under varying network conditions. Traditionally, the caching server just plays the stored video according to the redirected request. There is no interaction with the network concerning the required resources, although the caching server is located in the mobile network and available information could be utilized to enhance the user's QoE and the usage of the network's resources. This is equivalent to the behavior of an external or $3^{rd}$ party streaming server, which usually has no interface to exchange control information with the mobile network. The caching server does not inform the network about the required resources and thus the network cannot check the availability of the resources and allocate them appropriately (e.g., establishment or modification of dedicated bearers).

Another important issue is that, depending upon the capabilities of the user device (e.g., resolution) and the load conditions in the network (e.g., congestion at the radio interface), the rate of the video should be adapted to provide the expected QoE. Additional functionality in the network is required to optimize the media (media optimizer), for example, according to the achievable throughput.

The transmission of a video from the mobile network to different devices (with different capabilities) under different network conditions is performed. Dependent on the varying network conditions the media is adapted. Measurements and monitoring data are collected as input for customer experience management (CEM). In addition, information from the UE (e.g., QoE metrics) and/or user might be received by the CEM system. But the information is not necessarily used to establish media sessions with appropriate resources and transmission rate.

In view of these issues, embodiments of the invention provide an improved method, apparatus, and system for multimedia streaming of cached content in mobile networks. One embodiment analyzes or characterizes cached streaming content according to its media characteristics, such as bandwidth (BW) demands. This information is then applied for efficient resource usage. For example, the required resources in the transmission path for an acceptable QoE can be determined and considered by the resource control entity when access to the content is requested. In order to provide an improved user experience and efficient resource usage, some embodiments add information about media context to the cached content over the lifetime of the whole cached session. In an embodiment, this media context describes specific BW information according to the potentially strongly varying video bit rate of a streaming media file.

More specifically, in one embodiment, multimedia content is analyzed according to its media characteristics. The media characteristics may include, for example, average BW demand over playtime, minimum BW, maximum BW, and/or BW variance parameters. The analysis of the multimedia content may be performed with streaming specific interpretation mechanisms to extract streaming protocol information (e.g., RTSP or HTTP streaming variants) and video format information (e.g., H264, etc.). The multimedia content may then be stored in a caching server (CS).

For each multimedia content, the analyzed media characteristics together with other information (e.g., playtime) is stored in a separate table or together with the content in the CS. If intended for use by the streaming service, media characteristics may be stored for different quality levels of streaming. Upon receiving a request to stream the multimedia content to the user, a mapping function may determine the actual resource requirements based on the analyzed media characteristics. The resource requirements may include actual attribute values (e.g., QoS parameters), and are used to trigger resource allocation in the network(s) via defined interfaces, such as the Rx interface for 3GPP networks. The attribute values may depend on the resource allocation mechanism of the underlying network and the interface offered from the resource control entity for the applications.

The resource requirements are signalled to the resource control entity, for example a policy control function (PCRF) in the case of a 3GPP network, via the above-mentioned interface. The resource control entity can in turn modify the policies and trigger the setup of an appropriate bearer with the necessary QoS parameters within the network, if feasible. If the required resources are not available, access to the content could be rejected. Alternatively, if acceptable for the service, re-selection of content with lower quality or transcoding of the content could be triggered.

Accordingly, embodiments of the invention are configured to create content or media characterization of cached multimedia content and use that characterization to provide efficient resource allocation (e.g., bearer setup in 3GPP network). One embodiment, therefore, provides an entity or table that stores the media characterization for the cached content, and provides a resource control entity that upon a request sent to the caching server triggers the appropriate resource allocation in the network(s) between the requesting user and the selected cache server. Coordinated interaction is needed between the caching server (CS) and the resource control entity (e.g., PCRF). In one embodiment, this coordinated interaction may be accomplished by a content aware traffic management entity for streaming services (CA-TMES). According to certain embodiments, CA-TMES may determine the appropriate QoS parameters for resource allocation in the underlying network dependent upon analyzed media content and optionally further information, such as device characteristics, network related information (e.g., load conditions), streaming service characteristics, and user experience data from previous streaming sessions. This information can be provided to CA-TMES by the CEM, which may be a part of the operations support system (OSS), or from other sources of information. CA-TMES may provide an interface to the resource control entity for allocation of the appropriate resources.

In one embodiment, CEM performs an analysis of the measurements and other data received from various entities in the network and provides information concerning the QoE of a user for the associated multimedia content (e.g., video stream). The QoE measurement values may include, for example, information exchanged during session establishment (e.g., information exchanged via RTSP and embedded SDP or via HTTP GET request) or during the session (e.g. received RTCP reports, rate adaptation requested by user in case of adaptive http streaming).

The OSS may also receive QoE measurement values from the UE with or without user interaction. Interactive feedback describes information from the user concerning the experienced quality. The OSS receives measurement values from the eNB/RNC concerning the quality at the radio interface. The received measurement values may be analyzed by the CEM system and, in addition to the customer feedback data, the CEM may provide information about the optimal QoS parameters for a certain multimedia content or video file. For example, the CEM can provide information about which rate under certain network conditions should be selected to provide the best possible QoE, minimum bandwidth, average bandwidth to CA-TMES.

Supporting the streaming with different video bitrates, the CS can store different encodings of a video. Alternatively, transcoding of a video file can be done on demand, for example, by an integrated or external media optimizer.

The CS has an interface to CA-TMES to inform about a session establishment request and to request resources in the network associated with the media characteristics of the selected video file. CA-TMES can decide, dependent upon the traffic load or congestion status in the current cell (cell information requested from OSS), device capabilities and other received metrics from CEM about the appropriate media characteristics (e.g., video bitrate).

FIG. 1 illustrates an example of a system implementing one embodiment of the invention. The example of FIG. 1 illustrates how an embodiment may be implemented in a 3GPP network. It should be understood, however, that embodiments are applicable to other mobile wireless or networks and are not limited to a 3GPP network.

As illustrated in FIG. 1, at 1, new video content has been inserted into the caching system 107. In this example, a media context table 108 and a media optimizer 109 are integrated into the caching system 107. In an embodiment, the storage of new content triggers analysis of the content (e.g., video file) and storage of media description information in different quality levels within the media context table 108.

At 2, a user equipment 100 attached to the 3GPP network requests access to the video file in the caching system 107 via a default bearer. At 3, the initial HTTP GET message received by the cache system 107 triggers the resource allocation process. Hence, the cache system 107 requests resources for the video file from a serving CA-TMES node 106. In one embodiment, the request to the CA-TMES node 106 may also contain media context information for different streaming quality. If the requested streaming content in the cache is based on RTP, for example, the RTSP "PLAY" request can be the trigger for resource allocation. It should be noted that CA-TMES 106 can be a standalone node as illustrated in FIG. 1 or may be a part of or co-located with the cache system 107 or the PCRF 104.

At 4, additional information to estimate resource requirements is requested from CEM 103, which is part of the OSS 102. User and application information may be included in the request to allow unique identification together with media context information.

At 5, OSS 102 receives information about radio access conditions from the eNB 101 about the requesting user equipment 100 and device specific information. In addition, service specific information may be received and, for the example described herein, streaming for specific content should be possible for three quality levels. Even if content is not available for all quality levels, the CDN system supports transcoding. If it is the first time a video file is requested by a user, QoE may not be available for the stream since it is the first request.

At 6, from the derived information, CEM 103 may determine or conclude, for instance, that a certain resolution can be supported by the network and would best fit the device characteristics of the requesting user. Then, at 7, CA-TMES 106 indicates to the caching system 107 the determined quality level that should be used for the video file in consideration. When the content is not available in the CDN system, transcoding may be used for access to the video file.

At 8, CA-TMES 106 initiates reservation via the Rx interface with PCRF 104 with the appropriate attribute values according to the mapping based on the described media information. In one embodiment, the Rx interface is extended in order to provide additional information about QoS parameters, such as bandwidth variance over time. This enables PCRF 104 to apply more efficient binding of an application flow towards bearer services (especially for non-GBR bearers, which share resources with other application flows).

At 9, according to 3GPP procedures, resources are requested for the dedicated bearer setup (radio access bearer and bearer in packet core network including resources in the mobile backhaul). In addition, the appropriate resources are allocated between PDN-GW 105 and the CDN network via the SGi interface, for example.

At 10, after CA-TMES 106 informs the caching system 107 about the successful reservation, the first HTTP object is returned to the user equipment 100. If the cached content is based on RTP, the server starts streaming RTP payload. Then, at 11, during the transfer of streaming data, the media optimizer 109 provides feedback to CEM 103 about the quality of content delivery, for example, based on RTCP receiver reports or parameters related to TCP connection in case of HTTP streaming.

At 12, after streaming is finished, customer feedback information can be collected by CEM 103. This information can be used to adapt resource allocation for future requests to the video streaming content.

In an embodiment, CA-TMES 106 can interact with the resource control entity (e.g., PCRF 104) in order to provide initial and updated media flow information for the control of the network resources on behalf of the multimedia application. This information can be used to initiate or modify bearer resource allocation. As mentioned above, the Rx interface can be used for the information exchange between CA-TMES 106 and PCRF 104. As shown in FIG. 1, CA-TMES 106 has an interface to OSS 102. The OSS 102 informs the CA-TMES 106 about detected congestions in the radio network. In case of changed load conditions reported by OSS 102, CA-TMES 106 may need to prioritize between media flows in the considered radio cell. Therefore, CA-TMES 106 may request from OSS 102 the identities of all subscribers located in a reported radio cell. CA-TMES 106 may decide to change stream specific properties of single or multiple flows at a time based on received trigger from OSS 102 by sending a request to the responsible CS. Changing stream specific properties and resource allocation for a stream, via the resource control entity (e.g., PCRF 104), can be jointly and consistently triggered by CA-TMES 106.

Figure 2:
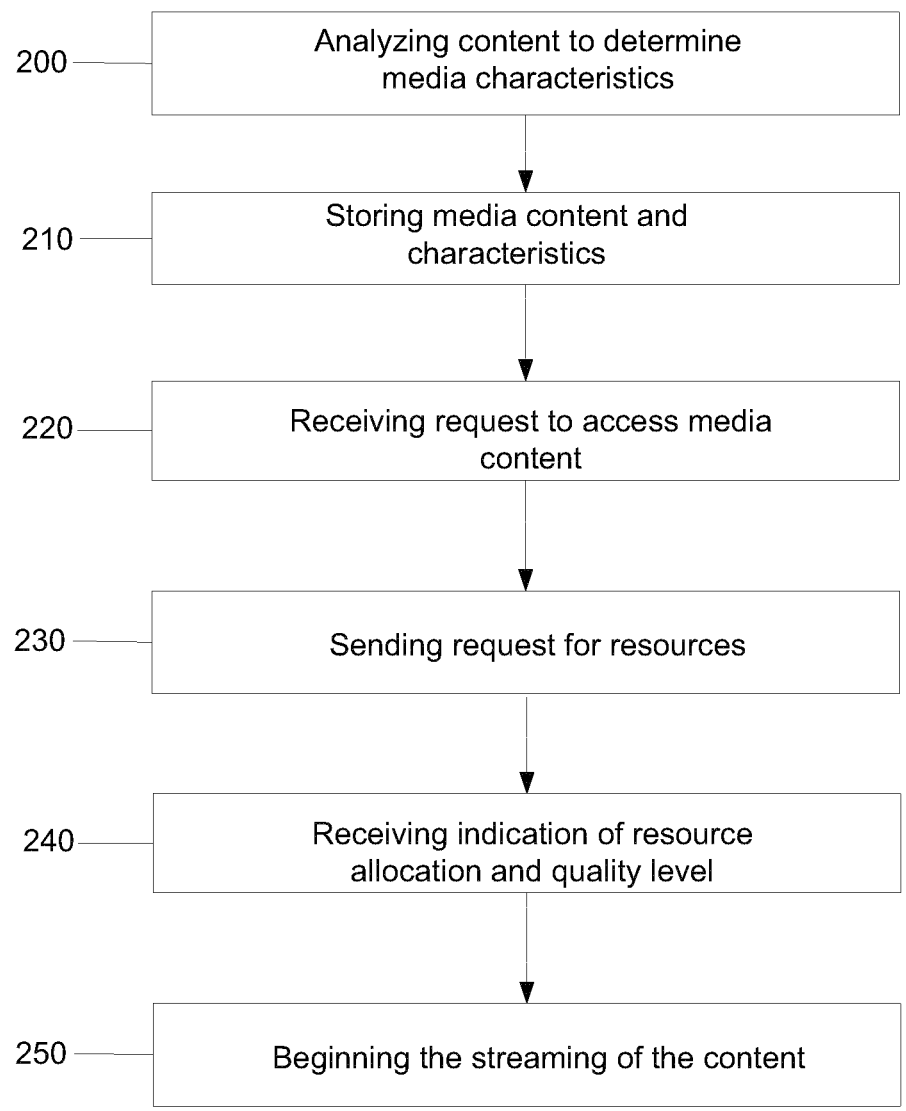
FIG. 2 illustrates a flow diagram of a method according to one embodiment.

FIG. 2 illustrates an example of a flow diagram of a method for storing multimedia content and allocating resources in the network for the multimedia content. In one embodiment, the method illustrated in FIG. 2 may be performed by the caching server (CS) discussed above. The method may include, at 200, analyzing newly received multimedia content to determine media characteristics thereof. The media characteristics may include, for example, media description information of different quality levels. The method may then include, at 210, storing the multimedia content and the media characteristics. According to certain embodiments, the media characteristics may be stored in a separate media context table or may be stored together with the multimedia content. At 220, the method may include receiving a request to access the multimedia content from a user. The request from the user may then trigger a resource allocation process such that the method includes, at 230, sending a request for resources for the multimedia content to the CA-TMES 106. The request for resources may include the media characteristics of the multimedia content. The method may then include, at 240, receiving an indication of quality level for the multimedia content, as well as an indication of successful resource allocation for the multimedia content, from the CA-TMES 106. The method can further include, at 250, starting the streaming of the multimedia content to the user on the resources indicated by the CA-TMES 106.

Figure 3:
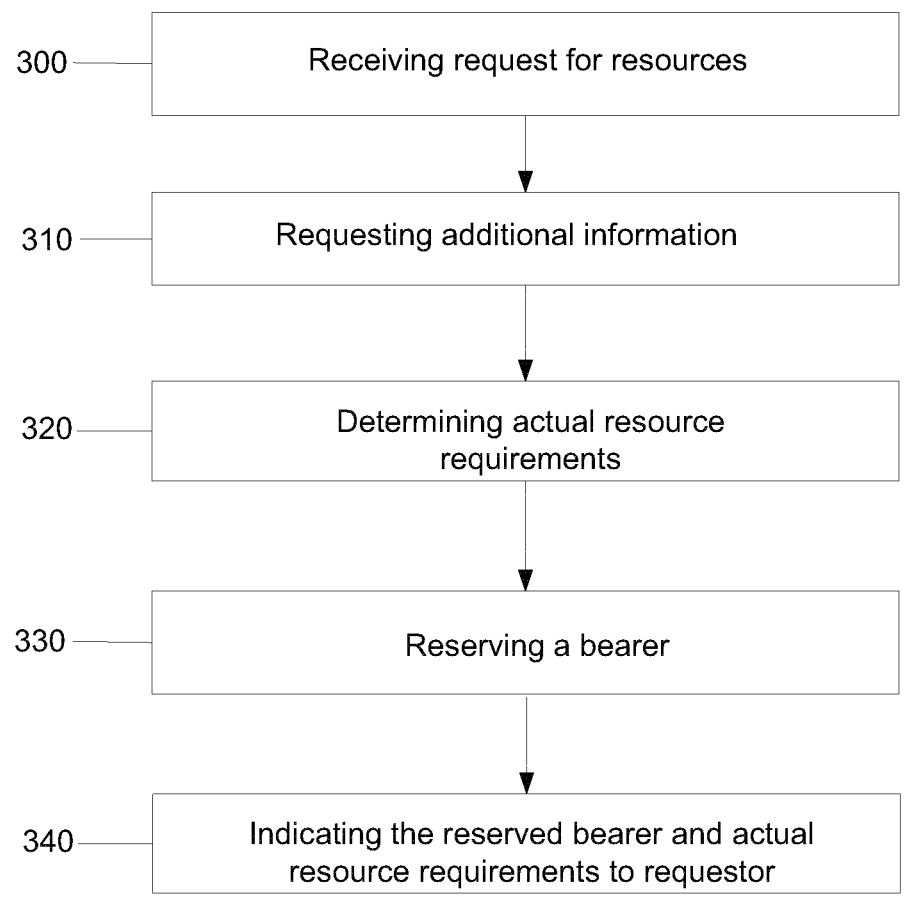
FIG. 3 illustrates a flow diagram of a method according to another embodiment.

FIG. 3 illustrates an example of a flow diagram of a method for allocating resources in a network for multimedia content, according to one embodiment. The method illustrated in FIG. 3 may be performed by the CA-TMES 106, for example. The method may include, at 300, receiving a request for resources to be allocated to multimedia content in the network. As discussed above in connection with FIG. 2, the request for resources may include media characteristics for the multimedia content. The method may then include, at 310, sending a request for additional information to estimate resource requirements for the multimedia content to the OSS 102, for example. This request for additional information may include user and application information, as well as the media characteristics of the multimedia content. The method can then include, at 320, determining actual resource requirements for the multimedia content that can be supported by the network. At 330, the method includes reserving the resources including, for example, a bearer with QoS parameters according to the actual resource requirements. In one embodiment, the reservation is initiated via the Rx interface with the PCRF 104. The method then includes, at 340, indicating the reserved bearer and the actual resource requirements to the caching server storing the multimedia content.

Figure 4:
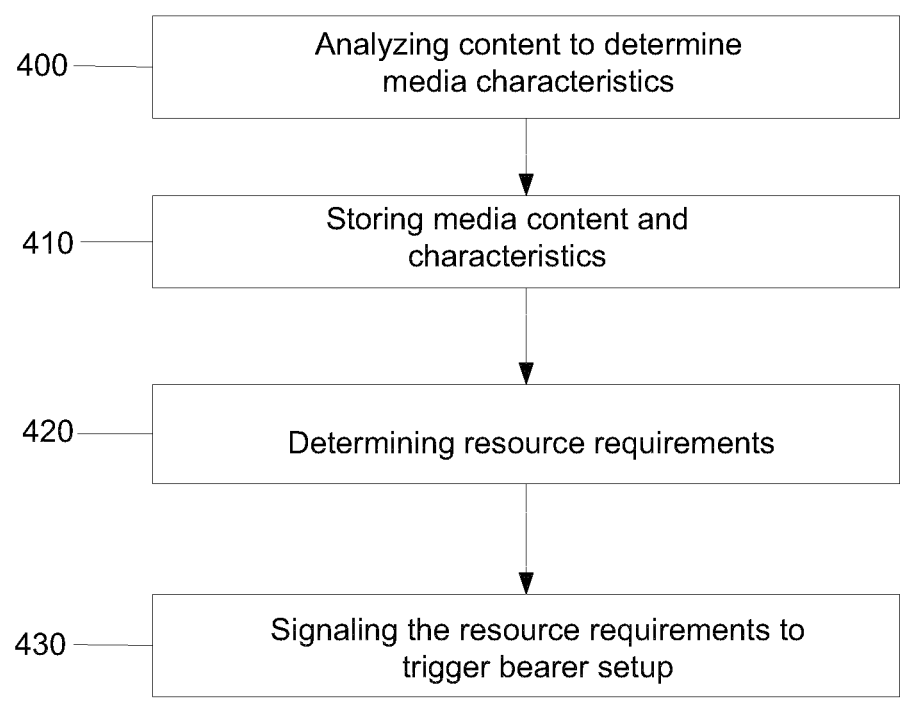
FIG. 4 illustrates a flow diagram of a method according to another embodiment.

FIG. 4 illustrates another embodiment of a flow diagram of a method for storing multimedia content and allocating resources in the network for the multimedia content. This embodiment may be performed by a caching server with the CA-TMES 106 located therein. In other words, in this embodiment, the CA-TMES 106 is co-located with the caching server and/or is a function of the caching server. The method includes, at 400, analyzing newly received multimedia content to determine its media characteristics. The method may then include, at 410, storing the multimedia content and the media characteristics. As mentioned above, according to certain embodiments, the media characteristics may be stored in a separate media context table or may be stored together with the multimedia content. The method then includes, at 420, upon receiving a request to stream the multimedia content to a user, determining actual resource requirements based on the media characteristics to trigger resource allocation in the network via defined interfaces. The determining of the actual resource requirements may include determining, by a mapping function, the actual attribute values, such as QoS parameters. The actual attribute values may depend upon the resource allocation mechanism of the network and the interface offered from the control entity for applications. The method may then include, at 430, signaling the determined resource requirements to the control entity to trigger the setup of an appropriate bearer with QoS parameters according to the determined resource requirements. If the determined resource requirements cannot be met by the network, then access to the multimedia content is rejected or re-selection of the multimedia content with lower quality or transcoding of the multimedia content is triggered.

In some embodiments, the functionality of the flow diagram of FIGS. 2-4, or that of any other method described herein, may be implemented by a software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

The computer readable media mentioned above may be at least partially embodied by a transmission line, a compact disk, digital-video disk, a magnetic disk, holographic disk or tape, flash memory, magnetoresistive memory, integrated circuits, or any other digital processing apparatus memory device.

Figure 5:
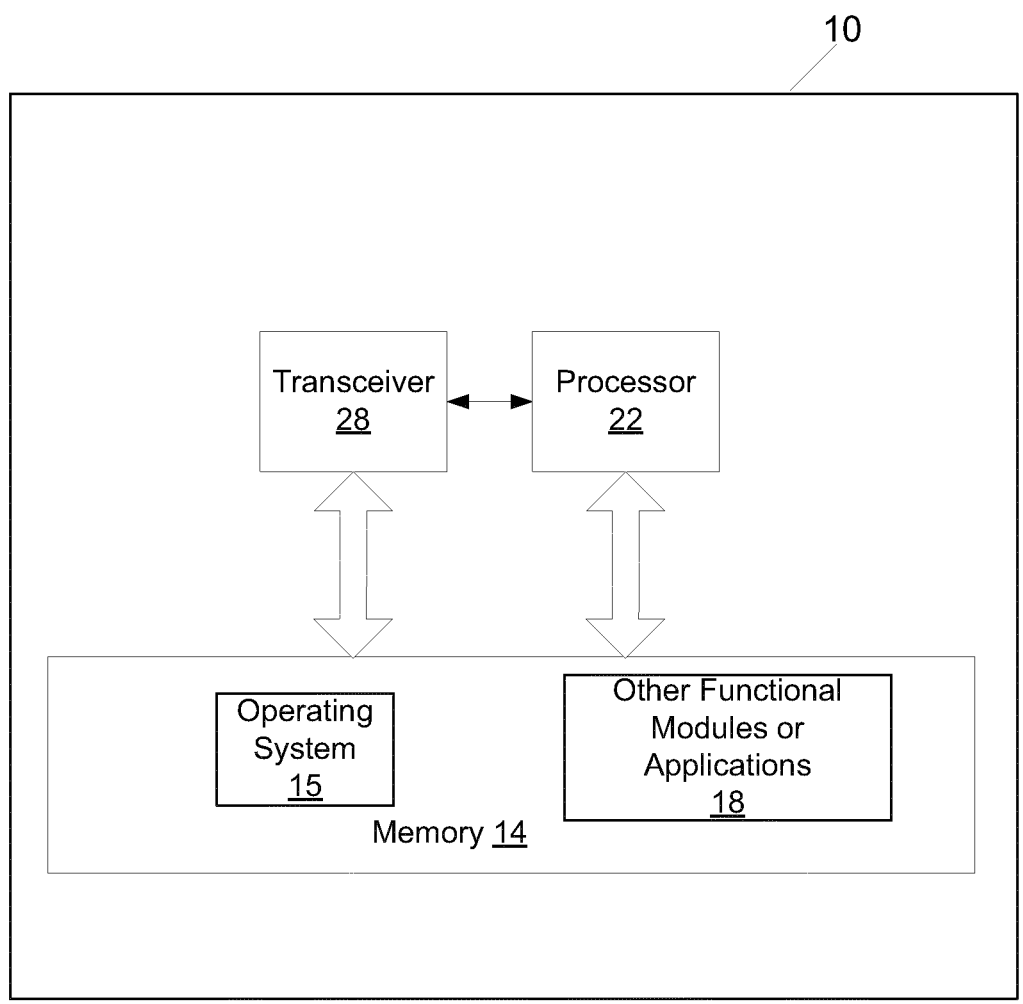
FIG. 5 illustrates an apparatus according to an embodiment.

FIG. 5 illustrates an apparatus 10 according to one embodiment. In some embodiments, apparatus 10 may be the CA-TMES 106, caching system 107, and/or PCRF 104 illustrated in FIG. 1, for example. Apparatus 10 includes a processor 22 for processing information and executing instructions or operations. Processor 22 may be any type of general or specific purpose processor. While a single processor 22 is shown in FIG. 5, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable or transmitting and receiving signals or data directly. According to an embodiment, the transceiver 28 is capable of supporting dual radio operation.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

According to one embodiment, apparatus 10 may be the caching system 107 illustrated in FIG. 1. In this embodiment, memory 14 and the computer program code stored thereon may be configured, with processor 22, to cause the apparatus 10 to analyze newly received multimedia content to determine media characteristics thereof. Apparatus 10 may then be controlled to store the multimedia content and the media characteristics in memory 14, for example. The media characteristics may be stored in a separate media context table of memory 14 or may be stored together with the multimedia content. Apparatus 10 can also be controlled to receive a request to access the multimedia content from a user. Apparatus 10 may then be controlled to send a request for resources for the multimedia content to a traffic management node. The request for resources may include the media characteristics of the multimedia content. Apparatus 10 may also be controlled to receive an indication of quality level for the multimedia content, as well as an indication of successful resource allocation for the multimedia content, from the traffic management node. Apparatus 10 may then be controlled to start the streaming of the multimedia content to the user on the resources indicated by the traffic management node.

According to another embodiment, apparatus 10 may be the CA-TMES 106 illustrated in FIG. 1. In this embodiment, memory 14 and the computer program code stored thereon may be configured, with processor 22, to cause the apparatus 10 to receive a request for resources to be allocated to multimedia content in the network. The request for resources may include media characteristics for the multimedia content. Apparatus 10 may then be controlled to send a request for additional information to estimate resource requirements for the multimedia content to the OSS 102, for example. This request for additional information may include user and application information, and the media characteristics of the multimedia content. Apparatus 10 may then be controlled to determine actual resource requirements for the multimedia content that can be supported by the network, and to reserve the resources including, for example, a bearer with QoS parameters according to the actual resource requirements. Apparatus 10 can then indicate the reserved bearer and the actual resource requirements to the caching server storing the multimedia content.

In another embodiment, apparatus 10 may be the caching system 107 and also incorporate the traffic management function of CA-TMES 106. In this embodiment, memory 14 and the computer program code stored thereon may be configured, with processor 22, to cause the apparatus 10 to analyze newly received multimedia content to determine its media characteristics. Apparatus 10 may then store the multimedia content and the media characteristics in memory 14, for example. As mentioned above, according to certain embodiments, the media characteristics may be stored in a separate media context table of memory 14 or may be stored together with the multimedia content. Upon receiving a request to stream the multimedia content to a user, apparatus 10 is controlled to determine actual resource requirements based on the media characteristics to trigger resource allocation in the network via defined interfaces. In one embodiment, apparatus 10 may include a mapping function, which may be stored in memory 14, configured to determine the actual resource requirements by calculating actual attribute values, such as QoS parameters. As discussed above, the actual attribute values may depend upon the resource allocation mechanism of the network and the interface offered from the control entity for applications. Apparatus 10 may then be controlled to signal the determined resource requirements to the control entity to trigger the setup of an appropriate bearer with QoS parameters according to the determined resource requirements.

In view of the above, embodiments of the invention provide several distinct advantages. These advantages include, but are not limited to, better resource allocation and bearer setup and modification. In particular, the additional knowledge of the media characteristics of the multimedia content that has been cached will result in improved resource allocation and bearer setup. Further, knowing the BW requirements in advance supports an efficient admission control and QoS-aware scheduler. Additionally, as outlined above, embodiments of the invention provide for the interaction of CEM system with entities providing streaming services to enable an enhanced QoE for the user and an optimized usage of network resources. Due to the knowledge of the BW demands, an optimal allocation of resources can be guaranteed. In combination with further KPIs, and the network load, analysis and interpretation within the CA-TMES, an optimal decision in real-time for the bearer setup/modification becomes possible.

The described features, advantages, and characteristics of the invention may be combined in any suitable manner in one or more embodiments. One skilled in the relevant art will recognize that the invention may be practiced without one or more of the specific features or advantages of a particular embodiment.

Therefore, one having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
analyzing, by a caching server, streaming multimedia content to determine media characteristics of the multimedia content comprising at least one of bandwidth demand over playtime and bandwidth variance parameters;
receiving a request to access the multimedia content from a user;
sending a request for resources for the multimedia content to a traffic management node, wherein the request for resources comprises the determined media characteristics of the multimedia content;
triggering an appropriate resource allocation in a network by adding information about media context to the cached content over the lifetime of the whole cached session; and
in response to sending a request for resources for the multimedia content to a traffic management node, receiving an indication of successful resource allocation and an indication of quality level for the multimedia content from the traffic management node.

2. The method according to claim 1, further comprising optimizing the multimedia content according to achievable throughput.

3. The method according to claim 1, further comprising:
storing the multimedia content; and
storing the media characteristics in a separate media context table or together with the multimedia content.

4. The method according to claim 1, further comprising starting streaming of the multimedia content to the user on the resources allocated via the traffic management node.

5. The method according to claim 1, wherein the analyzing comprises analyzing the multimedia content with streaming specific interpretation mechanisms to extract streaming protocol information and video format information, and wherein the extracted streaming protocol information and video format information is included as part of the media characteristics.

6. An apparatus, comprising:
at least one processor; and
at least one memory including computer program code, wherein the at least one memory and the computer program code are configured, with the at least one processor, to cause the apparatus at least to:
analyze streaming multimedia content to determine media characteristics of the multimedia content comprising at least one of bandwidth demand over playtime and bandwidth variance parameters;
receive a request to access the multimedia content from a user;
send a request for resources for the multimedia content to a traffic management node, wherein the request for resources comprises the determined media characteristics of the multimedia content;
trigger an appropriate resource allocation in a network by adding information about media context to the cached content over the lifetime of the whole cached session; and
in response to sending a request for resources for the multimedia content to a traffic management node, receive an indication of successful resource allocation and an indication of quality level for the multimedia content from the traffic management node.

7. The apparatus according to claim 6, wherein the at least one memory and the computer program code are further configured, with the at least one processor, to cause the apparatus at least to optimize the multimedia content according to achievable throughput.

8. The apparatus according to claim 6, wherein the at least one memory and the computer program code are further configured, with the at least one processor, to cause the apparatus at least to
store the multimedia content; and
store the media characteristics in a separate media context table or together with the multimedia content.

9. The apparatus according to claim 6, wherein the at least one memory and the computer program code are further configured, with the at least one processor, to cause the apparatus at least to start streaming of the multimedia content to the user on the resources allocated via the traffic management node.

10. The apparatus according to claim 6, wherein the at least one memory and the computer program code are further configured, with the at least one processor, to cause the apparatus at least to analyze the multimedia content with streaming specific interpretation mechanisms to extract streaming protocol information and video format information, and wherein the extracted streaming protocol information and video format information is included as part of the media characteristics.

11. The apparatus according to claim 6, wherein the apparatus is a caching server.

12. A computer program embodied on a computer readable storage medium, the computer program configured to control a processor to perform a process, the process comprising:
analyzing, by a caching server, streaming multimedia content to determine media characteristics of the multimedia content comprising at least one of bandwidth demand over playtime and bandwidth variance parameters;
receiving a request to access the multimedia content from a user;
sending a request for resources for the multimedia content to a traffic management node, wherein the request for resources comprises the determined media characteristics of the multimedia content;
triggering an appropriate resource allocation in a network by adding information about media context to the cached content over the lifetime of the whole cached session; and
in response to sending a request for resources for the multimedia content to a traffic management node, receiving an indication of successful resource allocation and an indication of quality level for the multimedia content from the traffic management node.

13. A method, comprising:
receiving, from a caching server, a request for resources to be allocated to streaming multimedia content in a network, wherein the request for resources comprises media characteristics of the multimedia content comprising at least one of bandwidth demand over playtime and bandwidth variance parameters;
determining, based at least in part on the media characteristics, actual resource requirements for the multimedia content that can be supported by the network;
reserving a bearer with attribute values according to the actual resource requirements for the multimedia content; and
in response to determining that the actual resource requirements cannot be met by the network, the method further comprises at least one of:
re-selecting the multimedia content with a lower quality; and
triggering transcoding of the multimedia content.

14. The method according to claim 13, wherein the reserving comprises signaling the actual resource requirements via a Rx interface to a control entity to trigger setup of the bearer with the attribute values.

15. The method according to claim 13, wherein the attribute values comprise quality of service parameters.

16. The method according to claim 13, further comprising requesting additional information to estimate resource requirements for the multimedia content from an operation support system, wherein the request for additional information comprises user and application information.

17. The method according to claim 13, further comprising indicating the actual resource requirements and/or the reserved bearer to a caching server storing the multimedia content.

18. An apparatus, comprising:
at least one processor; and
at least one memory including computer program code, wherein the at least one memory and the computer program code are configured, with the at least one processor, to cause the apparatus at least to:
receive from a caching server a request for resources to be allocated to streaming multimedia content in a network, wherein the request for resources comprises media characteristics of the multimedia content comprising at least one of bandwidth demand over playtime and bandwidth variance parameters;
determine, based at least in part on the media characteristics, actual resource requirements for the multimedia content that can be supported by the network;

reserve a bearer with attribute values according to the actual resource requirements for the multimedia content; and in response to determining that the actual resource requirements cannot be met by the network, the at least one memory and the computer program code are configured, with the at least one processor, to further cause the apparatus at least to one of:

re-select the multimedia content with a lower quality; and trigger transcoding of the multimedia content.

19. The apparatus according to claim 18, wherein the at least one memory and the computer program code are further configured, with the at least one processor, to cause the apparatus at least to reserve the bearer by signaling the actual resource requirements to a control entity to trigger setup of the bearer with the attribute values.

20. The apparatus according to claim 18, wherein the attribute values comprise quality of service parameters.

21. The apparatus according to claim 18, wherein the at least one memory and the computer program code are further configured, with the at least one processor, to cause the apparatus at least to request additional information to estimate resource requirements for the multimedia content from an operation support system, wherein the request for additional information comprises user and application information.

22. The apparatus according to claim 18, wherein the at least one memory and the computer program code are further configured, with the at least one processor, to cause the apparatus at least to indicate the actual resource requirements and/or the reserved bearer to a caching server storing the multimedia content.

23. The apparatus according to claim 18, wherein the apparatus is content aware traffic management node.

24. A computer program embodied on a computer readable storage medium, the computer program configured to control a processor to perform a process, the process comprising:

receiving, from a caching server, a request for resources to be allocated to streaming multimedia content in a network, wherein the request for resources comprises media characteristics of the multimedia content comprising at least one of bandwidth demand over playtime and bandwidth variance parameters;

determining, based at least in part on the media characteristics, actual resource requirements for the multimedia content that can be supported by the network; and reserving a bearer with attribute values according to the actual resource requirements for the multimedia content; and in response to determining that the actual resource requirements cannot be met by the network, the process further comprises at least one of:

re-selecting the multimedia content with a lower quality; and triggering transcoding of the multimedia content.

* * * * *